United States Patent [19]

Kimura et al.

[11] Patent Number: 5,502,096
[45] Date of Patent: Mar. 26, 1996

[54] ROOM TEMPERATURE QUICK CURABLE ORGANOPOLYSILOXANE COMPOSITION

[75] Inventors: Tsuneo Kimura; Masatoshi Arai, both of Matsuida, Japan

[73] Assignee: Shin-Etsu Chemical Co., Ltd., Tokyo, Japan

[21] Appl. No.: 328,525

[22] Filed: Oct. 19, 1994

[30] Foreign Application Priority Data

Oct. 25, 1993 [JP] Japan .................. 5-288673

[51] Int. Cl.$^6$ ........................... C08K 5/07
[52] U.S. Cl. ............ 524/356; 524/717; 524/726; 524/772; 524/770; 524/773; 524/774; 524/864; 524/186; 524/233; 524/251; 524/300; 524/315; 524/359; 524/360; 528/17; 528/18; 528/26; 528/28
[58] Field of Search ................. 524/770, 864, 524/717, 726, 772, 770, 773, 774, 233, 186, 251, 300, 315, 359, 356, 360; 528/17, 18, 26, 28

[56] References Cited

U.S. PATENT DOCUMENTS 4,528,324   7/1985   Chung et al. ................. 524/864

Primary Examiner—Melvyn I. Marquis
Attorney, Agent, or Firm—Oblon, Spivak, McClelland, Maier & Neustadt

[57] ABSTRACT

A room temperature curable rubber composition of a condensation curing type that comprises as a base polymer a diorganopolysiloxane or a polyoxyalkylene in which both ends of the molecular chain are blocked with a hydrolyzable silyl group, and a carbonyl compound, an amino group containing organic compound, and an $\alpha,\beta$-unsaturated carbonyl compound that are blended with the base polymer. Since the room temperature curable rubber composition is cured with water in the air and at the same time the dehydration condensation of the carbonyl group and the amino group produces water in the composition, the quick curability and deep curability are improved remarkably.

11 Claims, No Drawings

ROOM TEMPERATURE QUICK CURABLE ORGANOPOLYSILOXANE COMPOSITION

BACKGROUND OF THE INVENTION

1. Field of the Invention

The present invention relates to a room temperature quick curable composition in which as a base polymer a diorganopolysiloxane or a polyoxyalkylene polymer is used, and more particularly to a room temperature quick curable composition of a condensation curable type that is excellent in quick curability, deep curability, and water resistance.

2. Description of the Prior Art

As room temperature quick curable compositions of a condensation curable type in which an organopolysiloxane or a polyoxyalkylene polymer is used as a base polymer, a one-liquid type composition wherein the amount of a crosslinking agent to be added for the base polymer is minimized to improve the rate of the crosslinking by hydrolysis and a two-liquid type composition wherein a crosslinking agent and a curing agent are packed separately are conventionally known.

However, the above one-liquid type composition is only quick in curing speed from the surface and a certain period of time is required to allow deep part to be cured, so that it is hardly said that the one-liquid type composition is quickly curable. On the other hand although the above two-liquid type composition is relatively excellent in deep curability, the two-liquid type composition has the defects that because the mixing ratio of the two liquids is not 1:1, the handling is troublesome and it is difficult to be suitably used, for example, by an automatic mixer. Further, to attain the curing completely in deep part, it is required that the amounts of the hydroxy groups at both ends of the base polymer and the crosslinking agent to be added are strictly prescribed or that water is added as a curing agent for deep part.

On the other hand, in the organopolysiloxane composition of an addition curable type, since the mixing ratio of the two liquids is 1:1, the workability is excellent, but generally a heating oven is needed for the curing. Further, since the curing catalyst is poisoned in the presence of an addition poison, the working atmosphere is restricted disadvantageously.

SUMMARY OF THE INVENTION

The present inventors previously suggested a room temperature quick curable composition that solved the above problems (Japanese Pre-examination Patent Publication (KOKAI) No. 5-279570). This composition comprises a diorganopolysiloxane or a polyoxyalkylene polymer wherein both ends of the molecular chain are blocked with a hydrolyzable silyl group, an organic compound having at least one C=O group in the molecule, and an organic compound having at least one $NH_2$ group in the molecule and is improved in quick curability at room temperature and deep curability by using the water that is concomitantly produced by the ketimine production reaction due to the dehydration condensation of the carbonyl group (C=O group) and the $NH_2$ group.

However, the results of the study made thereafter revealed that although the above composition was excellent in quick curability and deep curability, the problem of the water resistance, such as water resistance adhesive, was yet to be solved, and its application was very limited.

Therefore, an object of the present invention is to provide a room temperature quick curable organopolysiloxane or polyoxyalkylene polymer composition of a condensation curable type that is excellent in quick curability at room temperature and deep curability and also good in water resistance.

The present invention is based on a new finding that the problem of the water resistance in the above previously suggested composition (Japanese Pre-examination Patent Publication (KOKAI) No. 5-279570) is resulted from the effect of the primary amine remaining in the cured product and has succeeded in improving the water resistance while maintaining the quick curability and deep curability by changing that primary amine to a secondary amine.

That is, according to the present invention, there is provided a room temperature quick curable composition, comprising (A) a diorganopolysiloxane or a polyoxyalkylene polymer wherein both ends of the molecular chain are blocked with a hydrolyzable silyl group and that has a viscosity of 25 to 1000,000 centistokes at 25° C., (B) a carbonyl compound having at least one carbonyl group in the molecule and no unsaturated bond between the alpha carbon and the beta carbon, (C) an organic compound having at least one $NH_2$ group in the molecule, and (D) an organic compound having at least one $\alpha,\beta$-unsaturated carbonyl group in the molecule, with said components (B) and (C) being selected such that the carbonyl group and the $NH_2$ group are reactive with each other.

That is, in the present invention, the carbonyl group in the component (B) and the $NH_2$ group in the component (C) undergo a dehydration condensation reaction, producing water in deep part of the composition. This dehydration condensation reaction is represented by the following equation:

$$>CO + RNH_2 \Rightarrow >C=NR + H_2O \tag{1}$$

wherein R represents a monovalent organic group, and it will be understood that water is produced together with the ketimine compound. Since the water produced here is consumed in curing the base component, the quick curability and deep curability of the composition are remarkably improved. Further, since water is not blended as a deep part curing agent with the composition, such problems that the separation of water and the lowering in the workability due to an increase in thixotropy can be effectively solved.

Since the above dehydration condensation reaction is a reversible reaction, if water enters the cured product, the above reaction (1) proceeds reversibly and the reaction product, the ketimine compound, is hydrolyzed to produce the primary amine again. Since this amine compound increases the hydrophilic nature of the cured product, the water resistance of the cured product is conspicuously decreased. However, in the present invention, the component (D), the organic compound having an $\alpha,\beta$-unsaturated carbonyl group, reacts with the primary amine produced in the cured product by the intrusion of water to convert the primary amine into a secondary amine. This reaction can be represented by the below mentioned equation (2) in an instance wherein as the organic compound of the component (D) an organic compound represented by $CH_2=COOR^1$ in which $R^1$ represents a monovalent organic group is used:

$$R-NH_2 + CH_2=COOR^1 \Rightarrow R-NHC_2H_4COOR^1 \tag{2}$$

The primary amine produced here does not increase the hydrophilic nature of the cured product. Therefore, according to the present invention, the water resistance can be improved effectively.

According to the present invention, for a room temperature curable composition of a condensation curable type wherein an organopolysiloxane or a polyoxyalkylene polymer is used as the base, the quick curability and the deep curability can be improved remarkably without damaging the water resistance.

DETAILED DESCRIPTION OF THE PREFERRED EMBODIMENTS

Component (A)

The component (A) is a base polymer and at least one of diorganopolysiloxanes and polyoxyalkylenes is used as the component (A).

In the present invention, it is required that both ends of the molecular chain of any of these base polymers are blocked with a hydrolyzable silyl group. That is, due to the presence of the hydrolyzable groups, the polymer undergoes hydrolysis and polycondensation in the presence of water to form a rubberlike elastic cured product.

The hydrolyzable silyl group is a group wherein at least one hydrolyzable group is bonded to a silicon atom. Examples of the hydrolyzable group include a carboxyl group, a ketoxime group, an alkoxy group, an alkenoxime group, an amino group, an aminoxy group, and an amido group. Particularly preferable hydrolyzable groups are a ketoxime group, an alkoxy group, and an alkenoxime group.

The number of these hydrolyzable groups bonded to a silicon atom is not restricted one, and two or three such hydrolyzable groups may be bonded to one silicon atom. The silicon atom to which these hydrolyzable groups are bonded may of course have other organic groups. Preferably such organic groups are unsubstituted or substituted monovalent hydrocarbon groups, and more preferably unsubstituted or substituted hydrocarbon groups having 1 to 12 carbon atoms. Examples of the unsubstituted or substituted hydrocarbon group include an alkyl group having 1 to 6 carbon atoms, such as a methyl group, an ethyl group, and a propyl group, a cycloalkyl group having 6 to 12 carbon atoms, such as a cyclohexyl group, an alkenyl group having 2 to 6 carbon atoms, such as a vinyl group and an allyl group, and an aryl group having 6 to 12 carbon atoms, such as a phenyl group and a tolyl group, and corresponding substituted groups that are formed by replacing part of the hydrogen atoms of the above hydrocarbon groups by a halogen atom(s) or the like, such as a chloromethyl group, and a 3,3,3-trifluoropropyl group. Particularly preferable unsaturated or saturated monovalent hydrocarbon groups are a methyl group, a phenyl group, and a 3,3,3-trifluoropropyl group.

It is required that the component (A), the base polymer, has a viscosity in the range of 25 to 1,000,000 cSt, and preferably in the range of 1,000 to 100,000 cSt, at 25° C. If the viscosity falls outside this range, such disadvantages arise that it becomes difficult to form a rubber cured product having satisfactory properties or the workability is lowered.

Among the above-described base polymers, as the diorganopolysiloxane, for example, a diorganopolysiloxane represented by the following general formula (3):

wherein $R^2$, $R^3$, and $R^4$, which are the same or different, each represent the above mentioned monovalent organic group, X's independently each represent the above mentioned hydrolyzable group, m is an integer of 1 to 3, and n is a positive integer is appropriate.

Herein, the monovalent organic group represented by $R^2$, $R^3$, and $R^4$ includes organic groups other than the hydrolyzable groups given as examples for the above hydrolyzable silyl groups, and preferably the abovementioned unsubstituted or substituted monovalent hydrocarbon groups. Further, n is generally an integer of 10 or more, and preferably 10 to 2,000, since this diorganopolysiloxane is to have a viscosity in the above mentioned range.

Among the above-mentioned base polymers, the polyoxyalkylene polymer includes, for example, a polyoxyalkylene polymer represented by the following general formula (4):

wherein $R^5$'s independently each represent a linear or branched alkylene group having 2 to 12 carbon atoms, $R^6$'s independently represent a monovalent organic group, X has the same meaning as defined above, p is an integer of 1 to 500, and q and r are each an integer of 0 or 1.

The alkyl group represented by $R^5$ in the above general formula includes, for example, a methylene group, an ethylene group, and a propylene group. The organic group represented by $R^6$ includes, e.g., those exemplified by $R^2$ to $R^4$. The molecular weight of the polyoxyalkylene polymer represented by the above general formula (4) is preferably 1,000 to 30,000.

The oxyalkylene unit constituting the backbone chain of the polyoxyalkylene polymer represented by the above general formula (4) is preferably $-CH_2CH_2O-$, $-CH_2CH(CH_3)O-$, $-CH_2CH(CH_2CH_3)O-$, or $-CH_2CH_2CH_2CH_2O-$, and more preferably $-CH_2CH(CH_2)O-$ because it is easily available and in view of the cost. Of course, the oxyalkylene units constituting the backbone chain not only may be of one type of unit but also may be of two or more types of units that are mixed.

Among the polyoxyalkylene polymers represented by the general formula (4), preferred are
$(MeO)_3SiCH_2O[CH_2CH(Me)O]_nCH_2Si(OMe)_3$,
$(MeO)_3SiC_3H_6O[CH_2CH(Me)O]_nC_3H_6Si(OMe)_3$,
$(MeO)_2MeSiC_3H_6O[CH_2CH(Me)O]_nC_3H_6SiMe (OMe)_2$,
$(MeO)_2MeSiC_3H_6O[CH_2CH(Et)O]_nC_3H_6SiMe (OMe)_2$,
$(MeO)_2MeSiC_3H_6O[C_4H_8O]_nC_3H_6SiMe (OMe)_2$,
$(MeO)_2PhSiC_2H_4O[CH_2CH (Me)O]_nC_2H_4SiPh (OMe)_2$,
$(EtO)_3SiC_3H_6O[CH_2CH (Me)O]_nC_3H_6Si (OEt)_3$,
$(CH_2=CMeO)_3SiC_3H_6O [CH_2CH (Me)O]_nC_3H_6Si (OMeC=CH_2)_3$, $(CH_2=CMeO)_2MeSiC_3H_6O [CH_2CH (Me)O]_nC_3H_6SiMe (OMeC=CH_2)_2$ and $(MeEtC=NO)_2ViSiC_3H_6O [CH_2CH (Me)O]_nC_3H_6SiVi (ON=CMeEt)_2$ wherein Me, Et, Ph and Vi stand for methyl, ethyl, phenyl and vinyl groups, respectively.

Such a polyoxyalkylene polymer represented by the general formula (4) can be obtained by introducing the abovementioned hydrolyzable silyl group to both ends of the backbone chain consisting of oxyalkylene units. Specific examples thereof include a method wherein an oxyalkylene polymer having allyl groups at the ends and a hydrosilane having a hydrolyzable silyl group are subjected to an addition reaction in the presence of a platinum catalyst and a method wherein an oxyalkylene polymer having allyl groups at the ends and a halogenated alkylsilane having a hydrolyzable silyl group are subjected to a condensation reaction in the presence of metal sodium or metal potassium.

Component (B)

The component (B) is a carbonyl compound having at least one carbonyl group in the molecule except a carbonyl compound having an unsaturated bond between the alpha carbon and the beta carbon with respect to carbonyl group. Such a carbonyl compound having an unsaturated bond is excluded because it brings about a reaction represented by the above equation (2) as a side reaction, lowering the efficiency of the dehydration condensation reaction and making the quick curability unsatisfactory.

As the particular carbonyl compound, any carbonyl compound can be used as long as the carbonyl compound satisfies the above conditions and the carbonyl group exhibits the reactivity of the dehydration condensation reaction represented by the general equation (1). The carbonyl compound includes, for example, ketones, such as acetone, methyl ethyl ketone, and acetophenone; esters, such as ethyl acetate, butyl acetate, methyl propionate, and butyrolactone; amides, such as dimethylformamide, diethylacetamide, and butyrolactam; and silane coupling agents, various polymers, and oligomers having carbonyl groups as functional groups. Particularly, in the present invention, with a view to causing the dehydration condensation reaction of the above equation (1) to be completed effectively, carbonyl compounds wherein the alpha carbon atom with respect to the carbonyl group is a primary carbon atom or a secondary carbon atom, such as acetone, methyl ethyl ketone, methyl n-propyl ketone, methyl isopropyl ketone, cyclohexanone, ethyl acetate, butyrolactone, or carbonyl compounds wherein the alpha carbon atom with respect to the carbonyl group is part of an aromatic ring, such as acetophenone, benzophenone, methyl benzoate are suitable. In particular, methyl ethyl ketone and cyclohexanone are preferable. The above carbonyl compounds can be used singly or as a combination of two or more.

The amount of the component (B) to be blended is such that the amount of the carboxyl group is preferably in the range of 0.001 to 1 mol, and particularly in the range of 0.01 to 0.1 mol, per 100 mol of the component (A). If the amount is less than 0.001 mol, satisfactory deep curability cannot be exhibited while if the amount is over 1 mol, the obtainable elastic cured product fails to exhibit the intended physical properties.

Component (C)

As described above, the component (C), an organic compound having at least one $NH_2$ group (hereinafter simply referred to as "an amino group containing organic compound"), reacts with the component (B) to produce water that serves as a curing agent in deep part of the composition.

As the amino group containing organic compound, any amino group containing organic compound can be used so long as it has a reactive primary amino group that exhibits the reaction as shown by the above equation (1). Specific examples of the amino group containing organic compound include amines, such as methylamine, ethylamine, butylamine, ethylenediamine, and aniline; silane coupling agents having an $NH_2$ group as a functional group, such as γ-aminopropyltriethoxysilane; and polymers and oligomers having $NH_2$ groups. In the present invention, in view of the steric hindrance at the time of the reaction of the component (B), particularly an amino group containing organic compound wherein the alpha carbon atom with respect to the amino group is a primary carbon atom or a secondary carbon atom, such as methylamine, ethylamine, n-propylamine, isopropylamine, buthylamine, cyclohexylamine, γ-aminopropyltriethoxysilane, α,ω-trimethylsiloxymethyl(γ-aminopropyl)polysiloxane and an amino group containing organic compound wherein the alpha atom of the amino group is part of a aromatic ring are suitably used. In particular, butylamine, γ-aminopropyltriethoxysilane, α,ω-trimethylsiloxymethyl(γ-aminopropyl)polysiloxane are preferable.

These amino group containing organic compounds are not required to be used singly and two or more of them can be used.

Incidentally, an amino group containing organic compound wherein the alpha carbon atom of the amino group is a common tertiary carbon atom is poor in reactivity with the carbonyl group and cannot secure the desired effect in some cases.

Preferably the amount of the component (C) to be blended is such that the amount of the primary amino group is in the range of 0.001 to 1 mol, and particularly in the range of 0.01 to 0.1 mol, per 100 g of the component (A). If the amount is less than 0.001 mol, satisfactory deep curability is not exhibited while if the amount is over 1 mol, the obtainable elastic cured product fails to exhibit the intended physical properties.

Component (D)

This component is an organic compound having at least one $\alpha,\beta$-unsaturated carbonyl group (carbonyl group having an unsaturated group between an m-carbon and a β-carbon) in the molecule. The component (D) reacts with the primary amino group containing organic compound (corresponding to the component (C)) regenerated in the cured product by the intrusion of water to convert the primary amino group to a secondary amino group as shown in the above equation (2), thereby improving the water resistance of the cured product.

As that organic compound, any organic compound can be used so long as it has a reactive $\alpha,\beta$-unsaturated carbonyl group as shown by the above equation (2). In particular, acrylic or methacrylic compounds can be suitably used because they are excellent in reactivity, availability, and handrability. Such acrylic or methacrylic compounds generally include, but are not limited to, for example, monofunctional acrylates or methacrylates, such as methyl acrylate, ethyl acrylate, methyl methacrylate, ethyl methacrylate, dicyclopentenyl acrylate, and dicyclopentenyl oxyethylacrylate; polyfunctional acrylates or methacrylates, such as ethylene glycol diacrylate and trimethylolpropane trimethacrylate; silane coupling agents having an acryl group or a methacryl group, such as acryloxymethyldimethylmethoxysilane and γ-acryloxypropyltrimethoxysilane; and polymers and oligomers having acrylic groups and methacrylic groups. In particular, ethyl acrylate, γ-acryloxypropyltrimethoxysilane, γ-methacryloxypropyltriethoxysilane are preferable.

Preferably the amount of the component (D) to be blended is such that the amount of the $\alpha,\beta$-unsaturated carbonyl group is in the range of 0.001 to 10 mol, and particularly in the range of 0.01 to 0.1 mol, per 100 g of the component (A). If the amount is less than 0.001 mol, satisfactory water resistance is not exhibited while if the amount is over 10 mol, not only the obtainable elastic cured product does not exhibit the intended physical properties, but also, in some cases, the excess component (D) dissolves out from the cured product and soils the surroundings of the cured product.

Process of the preparation of the curable composition

The present composition can be obtained as a one-liquid type room temperature quick curable composition by uniformly mixing prescribed amounts of the components (A) to (D) in a dry atmosphere. In this case, to secure the shelf stability, the component (A) and the component (D) or the component (C) can be micro-capsulated and blended to form a one-liquid type room temperature quick curable composition or they can be formed into two packs, which can be mixed when used. In the later case, the two liquids may be mixed in a 1:1 ratio.

Further, unless the quick curability at room temperature and the deep curability are not impaired, various ingredients can be added and, if required, for example, a condensation catalyst, such as an organotin ester, an organotin chelate complex, an organic titanate, an organotitanium chelate complex, tetramethylguanidylpropyltrimethoxysilane, and tetramethylguanidylpropyltristrimethylsiloxysilane; a storage stabilizer, such as methyltrimethoxysilane, vinyltrimethoxysilane, tetramethoxysilane, methyltripropenoxysilane, vinyltripropenoxysilane, phenyltripropenoxysilane, methyltributanoximesilane, vinyltributanoximesilane, tetrabutanoximesilane, and methyltriacetoxysilane; a reinforcing filler, such as fumed silica, precipitated silica, titanium dioxide, aluminum oxide, quartz powder, carbon powder, talc, and bentonite; a basic filler, such as calcium carbonate, zinc carbonate, zinc oxide, and magnesium carbonate; a fibrous filler, such as asbestos, glass fiber, carbon fiber, and organic fiber; a colorant, such as a pigment and a dye; a heat resistance improver, such as red iron oxide and cerium oxide; a cold resistance improver; a rust preventive; an adhesion improver, such as γ-glysidoxypropyltriethoxysilane; and a liquid reinforcing agent, such as a network polysiloxane consisting of triorganosiloxy units and $SiO_2$ units can be added in prescribed amounts.

Parenthetically, since it is important that the component (B) and the component (C) react as shown in the above equation (1) to produce water that serves as a deep part curing agent, it is natural that the component (B) and the component (C) are selected and used such that such a reaction takes place quickly, and various ingredients that are optionally used are also selected and used such that the production of that water is not impaired.

Since the present composition is cured in the presence of water in the air and simultaneously with the curing, water is produced in deep part, the curing takes place not only from the surface but also from the inside. Therefore, the quick curability and the deep curability are improved greatly.

In the case wherein the present composition is made into a two-liquid package and the liquids are mixed when used, the serviceability is quite high because it acquires such a feature that the two liquids are easily mixed in a 1:1 ratio and the components (B), (C), and (D) are readily available.

Uses of the composition

Because of the quick curability and the deep curability, the present composition is suitable for use as an oil seal material for automobiles and also can advantageously be used as a potting material and a sealing material for the electric and electronic fields wherein recently the demand for rationalization of steps is high.

EXAMPLES

In the following Examples and Comparative Examples, the viscosity was measured at 25° C.

Comparative Example 1

100 g of a dimethylpolysiloxane wherein both ends of the molecular chain were blocked with a trimethoxysilyl group and that had a viscosity of 5,000 cSt, 0.2 g of dibutyltin dilaurate, 50 g of precipitated silica, and 8 g of fumed silica were mixed in the absence of water to prepare a curable silicone rubber composition.

The composition was poured into a glass cylindrical tube having a diameter of 20 mm and a length of 100 mm and was cured for 24 hours in an atmosphere of 20° C.–55% RH. After the curing, the glass tube was broken to take out the cured product and the thickness of the rubberlike elastic part was measured to be 4 mm.

Example 1

100 g of a dimethylpolysiloxane wherein both ends of the molecular chain were blocked with a trimethoxysilyl group and that had a viscosity of 5,000 cSt, 0.2 g of dibutyltin dilaurate, 0.58 g (0.01 tool) of acetone, 1.79 g (0.01 tool) of γ-aminopropyltrimethoxysilane, 4.68 g (0.02 tool) of γ-acryloxypropyltrimethoxysilane, 50 g of precipitated silica, and 8 g of fumed silica were mixed in the absence of water to prepare a curable silicone rubber composition.

Similarly to Comparative Example 1, the composition was cured in a glass cylindrical tube and the thickness of the rubberlike elastic part was measured to be 100 mm. From this, it can be understood that the present composition is excellent in deep curability.

Comparative Example 2

100 g of a dimethylpolysiloxane wherein both ends of the molecular chain were blocked with a vinyldi(methylethylketoxime)silyl group and that had a viscosity of 20,000 cSt, 1.0 g of dibutyltin dioctoate, 0.98 g (0.01 tool) of cyclohexanone, 2.21 g (0.01 tool) of γ-aminopropyltriethoxysilane, and 20 g of fumed silica were mixed in the absence of water to prepare a curable silicone rubber composition.

The composition was made into a sheet having a thickness of 2 mm and was allowed to stand for 6 hours in an atmosphere of 20° C.–50% RH to obtain a rubberlike elastic product, and the rubber physical properties were measured in accordance with JIS-K-6301, thereby obtaining the results shown in Table 1.

Further, after curing for 24 hours under the same conditions as given above, the cured product was dipped in warm water at 50° C. for 7 days, and after the dipping the rubber physical properties were measured in accordance with JIS-K-6301. The results are also shown in Table 1.

Example 2

100 g of a dimethylpolysiloxane wherein both ends of the molecular chain were blocked with a vinyldi(methylethyltoxime)silyl group and that had a viscosity of 20,000 cSt, 1.0 g of dibutyltin dioctoate, 0.98 g (0.01 tool) of cyclohexanone, 2.21 g (0.01 tool) of γ-aminopropyltriethoxysilane, 4.68 g (0.02 tool) of γ-acryloxypropyltrimethoxysilane, and 20 g of fumed silica were mixed in the absence of water to prepare a curable silicone rubber composition.

The composition was made into a sheet having a thickness of 2 mm and similarly to Comparative Example 2, a rubber elastic product was prepared and the rubber physical properties were measured. The results are shown in Table 1.

Also, similarly to Comparative Example 2, after dipping in warm water at 50° C. for 7 days, the rubber physical properties of the rubber elastic product were measured. The results are shown in Table 1.

TABLE 1

|  |  | Comparative Example 2 | Example 2 |
|---|---|---|---|
| Initial stage | Hardness JIS-A | 25 | 30 |
|  | Elongation (%) | 300 | 320 |
|  | Tensile strength kgf/cm² | 18 | 20 |
| After dipping | Hardness JIS-A | 7 | 25 |
|  | Elongation | 90 | 350 |
|  | Tensile strength kgf/cm² | 2 | 18 |

The hardness was measured by using an A-type spring tester of JIS-K-6301.

From the results in Table 1 given above, it can be understood that the composition of the present composition is good in water resistance as well as deep curability.

Comparative Example 3

100 g of a polypropylene oxide wherein both ends of the molecular chain were blocked with a vinyldiisopropenoxysilyl group and that had a viscosity of 4,500 cSt, 1.0 g of dibutyltin dimethoxide, and 200 g of calcium carbonate were mixed in the absence of water to prepare a curable silicone rubber composition.

The composition was made into a sheet having a thickness of 2 mm and similarly to Comparative Example 2, a rubber elastic product was prepared and the rubber physical properties were measured. The results are shown in Table 2.

Also, similarly to Comparative Example 2, after dipping in warm water at 50° C. for 7 days, the rubber physical properties of the rubber elastic product were measured. The results are shown in Table 2.

Comparative Example 4

100 g of a polypropylene oxide wherein both ends of the molecular chain were blocked with a vinyldiisopropenoxysilyl group and that had a viscosity of 4,500 cSt, 1.0 g of dibutyltin dimethoxide, 2.9 g (0.05 tool) of acetone, 2.21 g (0.01 tool) γ-aminopropyltriethoxysilane, and 200 g of calcium carbonate were mixed in the absence of water to prepare a curable rubber composition.

The composition was made into a sheet having a thickness of 2 mm and similarly to Comparative Example 2, a rubber elastic product was prepared and the rubber physical properties were measured. The results are shown in Table 2.

Also, similarly to Comparative Example 2, after dipping in warm water at 50° C. for 7 days, the rubber physical properties of the rubber elastic product were measured. The results are shown in Table 2.

Example 3

100 g of a polypropylene oxide wherein both ends of the molecular chain were blocked with a vinyldiisopropenoxysilyl group and that had a viscosity of 4,500 cSt, 1.0 g of dibutyltin dimethoxide, 2.9 g (0.05 mol) of acetone, 11.1 g (0.05 mol) of γ-aminopropyltriethoxysilane, 17.4 g (0.1 mol) of γ-acryloxymethyldimethylmethoxysilane, and 200 g of calcium carbonate were mixed in the absence of water to prepare a curable rubber composition.

The composition was made into a sheet having a thickness of 2 mm and similarly to Comparative Example 2, a rubber elastic product was prepared and the rubber physical properties were measured. The results are shown in Table 2.

Also, similarly to Comparative Example 2, after dipping in warm water at 50° C. for 7 days, the rubber physical properties of the rubber elastic product were measured. The results are shown in Table 2.

TABLE 2

|  |  | Comparative Example 3 | Comparative Example 4 | Example 3 |
|---|---|---|---|---|
| Initial stage | Hardness JIS-A | Measurement was impossible. | 25 | 30 |
|  | Elongation (%) |  | 250 | 300 |
|  | Tensile strength kgf/cm² |  | 12 | 17 |
| After dipping | Hardness JIS-A | — | 8 | 28 |
|  | Elongation (%) | — | 50 | 350 |
|  | Tensile strength kgf/cm² | — | 2 | 15 |

What is claimed is:

1. A room temperature quick curable composition, comprising
    (A) a diorganopolysiloxane or a polyoxyalkylene polymer wherein both ends of the molecular chain are blocked with a hydrolyzable silyl group and that has a viscosity of 25 to 1000,000 centistokes at 25° C.,
    (B) a carbonyl compound having at least one carbonyl group in the molecule and no unsaturated bond between the alpha carbon and the beta carbon,
    (C) an organic compound having at least one $NH_2$ group in the molecule, and
    (D) an organic compound having at least one α,β-unsaturated carbonyl group in the molecule, with said components (B) and (C) being selected such that the carbonyl group and the $NH_2$ group are reactive with each other.

2. A room temperature quick curable composition as claimed in claim 1, wherein said component (A) is a diorganopolysiloxane that is represented by the following general formula (3):

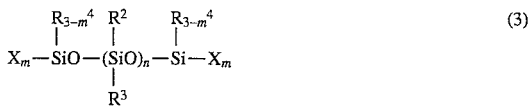

wherein $R^2$, $R^3$, and $R^4$, which are the same or different, each represent an unsubstituted or substituted monovalent hydrocarbon group, X represents a hydrolyzable group, m is an integer of 1 to 3, and n is a positive integer, and has a viscosity of 25 to 1,000,000 cetistokes at 25° C.

3. A room temperature quick curable composition as claimed in claim 1, wherein said component (A) is a polyoxyalkylene polymer represented by the following general formula (4):

wherein $R^5$'s independently each represent a linear or branched alkylene group having 2 to 12 carbon atoms, $R^6$'s independently represent a monovalent organic group, X represents a hydrolyzable group, p is an integer of 1 to 500, and q and r are each an integer of 0 or 1.

4. A room temperature quick curable composition as claimed in claim 3, wherein the oxyalkylene unit that constitutes the backbone chain of the polyoxyalkylene polymer represented by the above general formula (4) is $-CH_2CH_2O-$, $-CH_2CH(CH_3)O-$, $-CH_2CH(CH_2CH_3)O-$, or $-CH_2CH_2CH_2CH_2O-$.

5. A room temperature quick curable composition as claimed in claim 1, wherein said component (B) is a carbonyl compound wherein the alpha carbon atom with respect to the carbonyl group is a primary carbon atom or a secondary carbon atom.

6. A room temperature quick curable composition as claimed in claim 1, wherein said component (B) is a carbonyl compound wherein the alpha carbon atom with respect to the carbonyl group constitutes a part of an aromatic ring.

7. A room temperature quick curable composition as claimed in claim 1, wherein said component (C) is an amino group containing organic compound wherein the alpha carbon atom of the amino group is a primary carbon atom or a secondary carbon atom.

8. A room temperature quick curable composition as claimed in claim 1, wherein said component (C) is an amino group containing organic compound wherein the alpha carbon atom of the amino group constitutes a part of an aromatic ring.

9. A room temperature quick curable composition as claimed in claim 1, wherein said component (D) is an acrylic compound or a methacrylic compound.

10. A room temperature quick curable composition as claimed in claim 1, wherein said component (B) is blended in such an amount that the amount of the carbonyl group is 0.001 to 1 mol per 100 g of the component (A), said component (C) is blended in such an amount that the amount of the $NH_2$ group is 0.001 to 1 mol per 100 g of the component (A), and said component (D) is blended in such an amount that the amount of the $\alpha,\beta$-unsaturated carbonyl group is 0.001 to 10 mol per 100 g of the component (A).

11. A cured product obtained by curing a composition as claimed in claim 1.

* * * * *

UNITED STATES PATENT AND TRADEMARK OFFICE
CERTIFICATE OF CORRECTION

PATENT NO. : 5,502,096
DATED : March 26, 1996
INVENTOR(S) : Tsuneo KIMURA et al.

It is certified that error appears in the above-indentified patent and that said Letters Patent is hereby corrected as shown below:

On the title page, Item [22], the Filing date is incorrect. It should read:

--[22] Filed:  Oct. 25, 1994--

Signed and Sealed this

Eighteenth Day of June, 1996

Attest:

BRUCE LEHMAN

*Attesting Officer*     *Commissioner of Patents and Trademarks*